United States Patent
Rhee et al.

(10) Patent No.: US 12,288,894 B2
(45) Date of Patent: Apr. 29, 2025

(54) BATTERY MODULE

(71) Applicant: SK Innovation Co., Ltd., Seoul (KR)

(72) Inventors: Seo Roh Rhee, Daejeon (KR); Tae Il Kim, Daejeon (KR); Ho Yeon Kim, Daejeon (KR); Kang Gu Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 271 days.

(21) Appl. No.: 17/379,628

(22) Filed: Jul. 19, 2021

(65) Prior Publication Data

US 2022/0021073 A1    Jan. 20, 2022

(30) Foreign Application Priority Data

Jul. 20, 2020 (KR) .......... 10-2020-0089552

(51) Int. Cl.
*H01M 50/342* (2021.01)
*H01M 50/211* (2021.01)
*H01M 50/367* (2021.01)

(52) U.S. Cl.
CPC ..... *H01M 50/3425* (2021.01); *H01M 50/211* (2021.01); *H01M 50/367* (2021.01)

(58) Field of Classification Search
CPC ........... H01M 50/367; H01M 50/3425; H01M 50/358
See application file for complete search history.

(56) References Cited

U.S. PATENT DOCUMENTS

| | | | | |
|---|---|---|---|---|
| 4,207,387 A | * | 6/1980 | Jutte ................ | H01M 50/367 429/88 |
| 2004/0086778 A1 | * | 5/2004 | Nakano ............ | H01M 50/35 429/88 |
| 2012/0021270 A1 | * | 1/2012 | Kumar ............. | H01M 10/6566 429/120 |
| 2013/0095356 A1 | * | 4/2013 | Shimizu .......... | H01M 50/519 429/88 |
| 2013/0177785 A1 | * | 7/2013 | Hwang ............ | H01M 50/3425 429/53 |
| 2017/0237055 A1 | * | 8/2017 | Shimizu .......... | H01M 50/308 429/53 |
| 2020/0303701 A1 | * | 9/2020 | Kim ................. | H01M 50/271 |

FOREIGN PATENT DOCUMENTS

| | | | |
|---|---|---|---|
| JP | H09-279716 A | 10/1997 | |
| KR | 10-2017-0014309 A | 2/2017 | |
| KR | 20170137997 A | * 12/2017 | ...... H01M 10/425 |

* cited by examiner

*Primary Examiner* — Sadie White
*Assistant Examiner* — Kayla Elaine Clary
(74) *Attorney, Agent, or Firm* — IP & T GROUP LLP (57) ABSTRACT

A battery module includes a plurality of secondary battery cells, including at least one weak sealing portion, and a housing unit in which the plurality of secondary battery cells are accommodated. The housing unit includes a flame discharge opening formed to face the weak sealing portion such that flame or exhaust gas, discharged from the weak sealing portion, is induced to be discharged outwardly of the housing unit.

15 Claims, 5 Drawing Sheets

BATTERY MODULE

CROSS-REFERENCE TO RELATED APPLICATION(S)

This application claims benefit of priority to Korean Patent Application No. 10-2020-0089552 filed on Jul. 20, 2020 in the Korean Intellectual Property Office, the disclosure of which is incorporated herein by reference in its entirety.

BACKGROUND

1. Field

The present disclosure relates to a battery module.

2. Description of Related Art

As technological developments and demand for mobile devices, electric vehicles, and the like increase, demand for secondary battery cells as an energy source are rapidly increasing. A secondary battery cell is a battery that can be repeatedly charged and discharged with electricity because mutual conversion between chemical energy and electrical energy thereof is reversible.

Such a secondary battery cell includes an electrode assembly including a cathode, an anode, a separator, an electrolyte, and the like, a major component of the secondary battery, and a cell body member as a laminated film case protecting the electrode assembly.

In addition, a plurality of secondary battery cells may be mounted and installed as a battery module in an electric vehicle, an energy storage system (ESS), or the like.

However, the electrode assembly generates heat during a charging or discharging process, and the generation of heat causes an increase in temperature, resulting in a deterioration in performance of the secondary battery cell.

In addition, an explosion of one secondary battery cell, caused by internal factors of the battery module such as the increase in temperature of the secondary battery cell, or an explosion of one secondary battery cell, caused by an external impact, may lead to successive explosions of other secondary battery cells in the battery module.

In particular, gas or flame caused by explosion of one secondary battery cell may not be rapidly discharged to an external entity, resulting in successive explosions of other secondary battery cells.

Moreover, thermal propagation, flame or high-temperature and high-pressure gas, and the like, caused by explosion of one battery module, may affect another, adjacent battery module, resulting in successive explosions of battery modules.

Therefore, research into battery modules has been required to address the above-described issues.

RELATED ART DOCUMENT

Patent Document (Patent Document 1) Korean Patent Publication No. 10-2017-0014309 A (Feb. 8, 2017)

SUMMARY

An aspect of the present disclosure may provide a battery module addressing an issue in which explosion of one battery module leads to successive explosion of another, adjacent battery module.

Another aspect of the present disclosure is to provide a battery module which may rapidly discharge at least one of flame and gas, generated by an explosion of one secondary battery cell, from an inside of a housing unit.

According to an aspect of the present disclosure, a battery module includes: a plurality of secondary battery cells including at least one weak sealing portion; and a housing unit in which the plurality of secondary battery cells are accommodated. The housing unit includes a flame discharge opening formed to face the weak sealing portion such that flame or exhaust gas, discharged from the weak sealing portion, is induced to be discharged outwardly of the housing unit.

The flame discharge opening may be formed in an upper edge portion of the housing unit.

The flame discharge opening may include: a discharge coupling pipe coupled to the housing unit; and a discharge guide pipe coupled to the discharge coupling pipe and formed to extend toward the weak sealing portion from the discharge coupling pipe.

The discharge guide pipe may be formed to have a shape in which a width of the discharge guide pipe is increased in a direction toward the weak sealing portion from the discharge coupling pipe.

The flame discharge opening may includes: an opening formed in a portion of the housing unit facing the weak sealing portion; and an opening/closing plate portion opening and closing the opening.

The housing unit may include: a bottom member on which the plurality of secondary battery cells are seated; a front/rear member, provided on an edge of the bottom member, to which an electrode lead portion of the secondary battery cell is connected; a sidewall member provided on an edge of the bottom member and adjacent to the front/rear member; and a cover member disposed on upper ends of the front/rear member and the sidewall member. The flame discharge opening may be provided in at least one of a front/rear end portion of the cover member, adjacent to the front/rear member, and an upper end portion of the front/rear member adjacent to the cover member.

The flame discharge opening may be connected to a plate member provided in the housing unit to extend a flame path.

The plate member may include: a first plate portion disposed on one side; a second plate portion spaced apart from the first plate portion by a predetermined interval to be disposed on the other side; and a core portion disposed between the first plate portion and the second plate portion and extending a flame or gas path.

The core portion may be formed in a pattern in which a unit column portion having a shape of a hollow polygonal column is repeated.

The unit column portion may have at least two column surfaces in which opening portions are formed.

The column unit portion may have a first opening portion, formed adjacent to the first plate portion, and a second opening portion, formed adjacent to the second plate portion, to form a flame path in a zigzag form.

The plate member may include an accommodation member accommodated in a space between the first plate portion and the second plate portion and formed of a material for performing at least one of an extinguishing function, a heat absorption function, and a fire resistance function.

BRIEF DESCRIPTION OF DRAWINGS

The above and other aspects, features and other advantages of the present disclosure will be more clearly under

DETAILED DESCRIPTION

Prior to the description, it should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation. Therefore, the configurations described in the following description with reference the accompanying drawings do not represent all technical concepts or ideas of the present disclosure but should be considered to be exemplary embodiments of the present disclosure. It should be understood that various modifications and equivalents of the embodiments may be devised within the scope of the present invention at the time of the filing of the application.

Hereinafter, exemplary embodiments of the present disclosure will be described in detail with reference to the accompanying drawings. In the drawings, the same elements are denoted by the same reference numerals as much as possible. Furthermore, detailed descriptions related to well-known functions or configurations may be omitted in order not to unnecessarily obscure subject matters of the present disclosure. For the same reason, some of the elements in the accompanying drawings are exaggerated, omitted, or shown schematically, and the size of each element may not entirely reflect the actual size.

The present disclosure relates to a battery module which may address an issue in which an explosion of one battery module causes a successive explosion of another, adjacent battery module. Thus, the battery module according to the present disclosure may prevent thermal propagation to another battery module in a thermal runaway situation of one battery module.

In another aspect, a battery module according to the present disclosure may dissipate flame generated by an explosion of one battery module.

In another aspect, a battery module according to the present disclosure may rapidly discharge at least one of flame and gas, generated by an explosion one secondary battery cell 100, from an inside of a housing unit 200. Thus, the battery module according to the present disclosure may significantly reduce an effect of at least one of the flame and the gas, generated by the explosion of one secondary battery cell 100, on another secondary battery cell 100.

Figure 1:
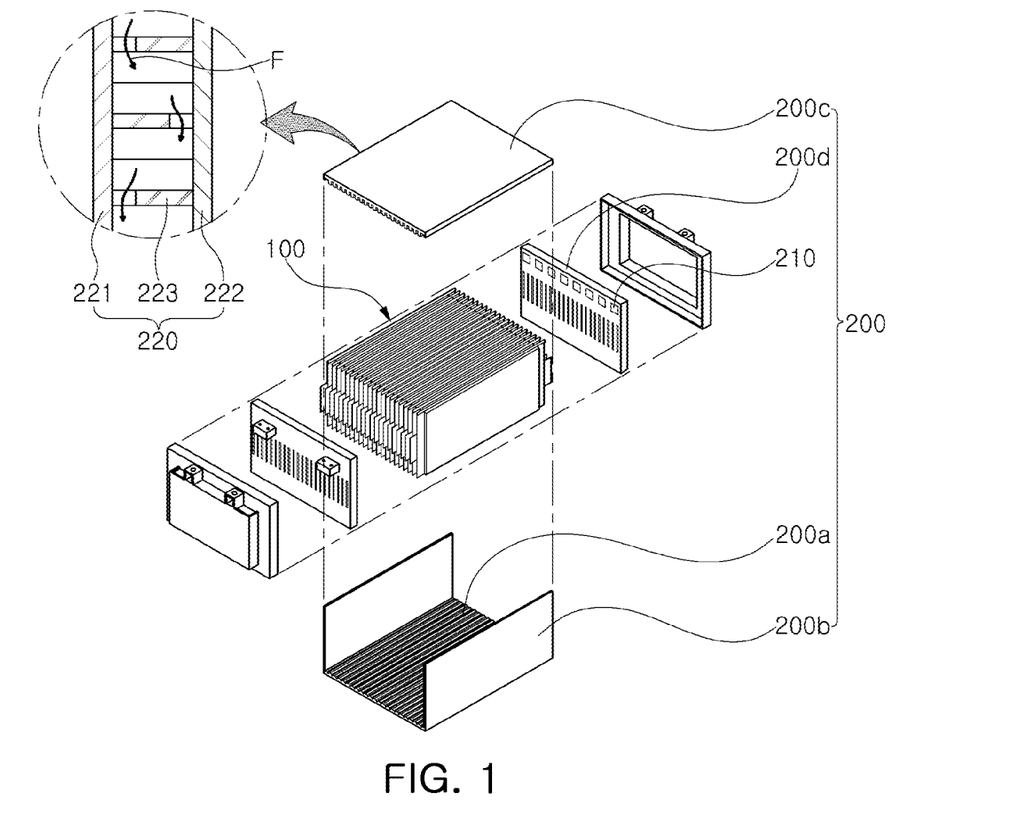
- FIG. 1 is an exploded perspective view of a battery module according to the present disclosure.
Figure 2:
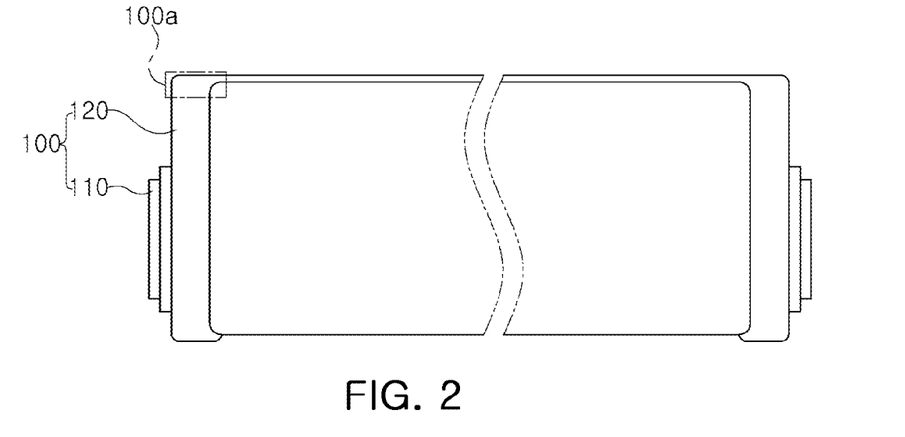
FIG. 2 is a front view of a secondary battery cell of the battery module according to the present disclosure.

Specifically, FIG. 1 is an exploded perspective view of a battery module according to the present disclosure, and FIG. 2 is a front view of a secondary battery cell 100 of the battery module according to the present disclosure.

Figure 3:
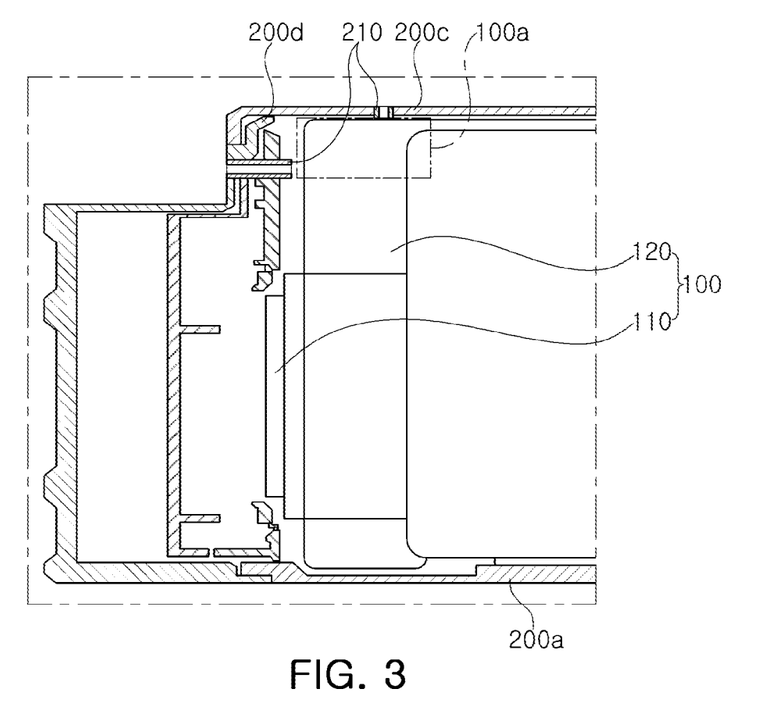
FIG. 3 is a front view illustrating the state in which a flame discharge opening is provided to face a weak sealing portion of the secondary battery cell in the battery module according to the present disclosure.
Figure 9A:
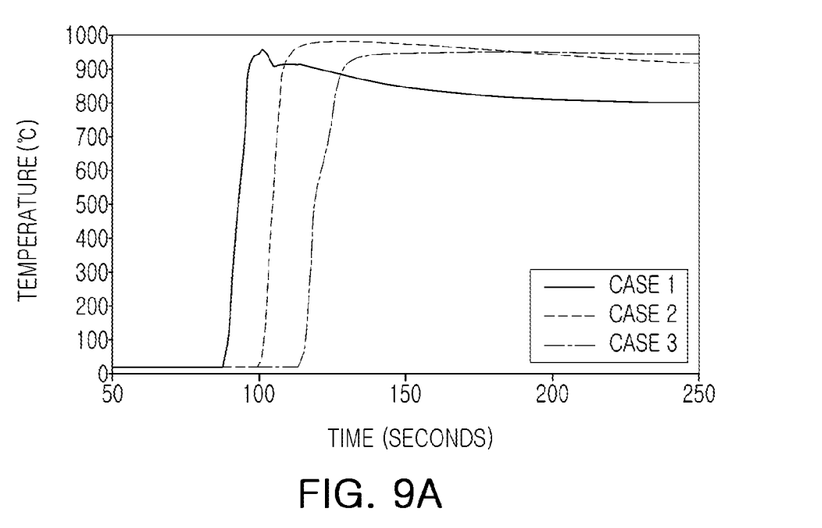
FIGS. 9A and 9B are graphs illustrating a comparison of temperature changes of a secondary battery cell in an example embodiment, in which a flame discharge opening is provided on a front/rear member, and an example embodiment, in which a flame discharge opening is provided on a cover member, in a battery module according to the present disclosure.
Figure 9B:
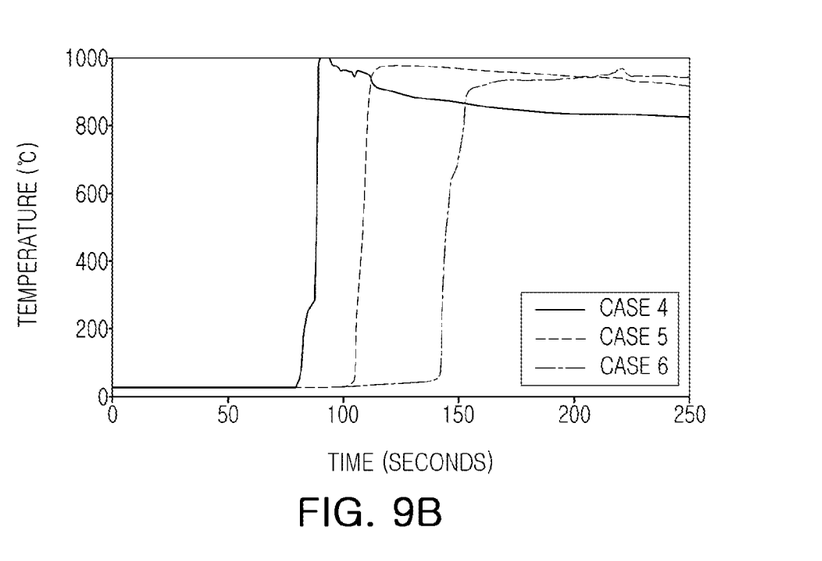

In addition, FIG. 3 is a front view illustrating the state in which a flame discharge opening 210 is provided to face a weak sealing portion 100a of the secondary battery cell 100 in the battery module according to the present disclosure, and FIGS. 9A and 9B are graphs illustrating a comparison of temperature changes of the secondary battery cell 100 in an example embodiment, in which a flame discharge opening 210 is provided on a front/rear member 200d, and an example embodiment, in which a flame discharge opening 210 is provided on a cover member 200c, in the battery module according to the present disclosure.

Referring to FIGS. 1, 2, 3, and 9, a battery module according to the present disclosure may include a secondary battery cell 100, a housing unit 200. Specifically, the housing unit 200 may include a flame discharge opening 210.

The secondary battery cell 100 may include at least one weak sealing portion 100a. And the housing unit 200 may accommodate the plurality of the secondary battery cells 100. The flame discharge opening 210, included in the housing unit 200, may be formed to face the weak sealing portion 100a such that flame or exhaust gas, discharged from the weak sealing portion 100a, may be induced to be discharged outwardly of the housing unit 200.

That is, the flame discharge opening 210 may be disposed to face the weak sealing portion 100a, so that the battery module according to the present disclosure may rapidly discharge flame, gas, or the like, discharged from the weak sealing portion 100a, from an inside of the housing unit 200.

Therefore, the battery module may address an issue in which flame, gas, or the like, generated by an explosion of one secondary battery cell 100, remain in the housing unit 200, so that other secondary battery cells 100 are relatively rapidly exposed to a high-temperature and high-pressure environment to cause rapid successive explosions.

The plurality of secondary battery cells 100 may be accommodated in an internal space of the housing unit 200.

The secondary battery cell 100 may include an electrode assembly and a cell body member surrounding the electrode assembly.

The electrode assembly may substantially include an electrolyte, and the electrolyte may be accommodated in the cell body member and used together with the electrode assembly. The electrolyte may include a lithium salt, such as LiPF6 or LiBF4, in an organic solvent such as ethylene carbonate (EC), propylene carbonate (PC), diethyl carbonate (DEC), ethyl methyl carbonate (EMC), or dimethyl carbonate (DMC). The electrolyte may be in a liquid, a solid, or a gel phase.

The cell body member is a component protecting the electrode assembly and accommodating the electrolyte therein. As an example, the cell body member may be provided as a pouch-type member or a can-type member. The pouch-type member, accommodating the electrode assembly therein while sealing the electrode assembly on three sides thereof, may be a component configured to seal the electrode assembly by overlapping and bonding the pouch-type member on three sides of the electrode assembly, usually an upper side and both lateral sides except one side that is a lower side, in a state in which the electrode assembly is accommodated in the pouch-type member. The can-type member, accommodating the electrode assembly therein while sealing the electrode assembly on one side thereof, may be a component configured to seal the electrode assembly by overlapping and bonding the can-type member on one side of the electrode assembly, usually an upper surface except for three sides that are a lower side and both lateral sides, in a state in which the electrode assembly is accommodated in the can-type member.

However, the pouch-type secondary battery cell 100 or the can-type secondary battery cell 100 is only an example of the secondary battery cell 100 accommodated in the battery module according to the present disclosure, and the secondary battery cell 100 accommodated in the battery module according to the present disclosure is not limited to the above-described types.

In the secondary battery cell 100, the weak sealing portion 100a may be formed in the sealing portion 120 formed to seal a periphery of the electrode assembly.

The weak sealing portion 100a may be a portion inevitably formed by a shape and a structure of the secondary battery cell 100. As an example, as illustrated in FIG. 2, a vertex portion of the secondary battery cell 100 may be weak in sealing, so that a weak sealing portion 100a may be formed in the vertex portion. In addition, the sealing portion 120 formed on an electrode lead portion 110 connected to the electrode assembly may be also weak in sealing to cause formation of the weak sealing portion 110a.

The housing member may serve as a body of a battery module in which the plurality of secondary battery cells 100 are accommodated.

For example, the housing member may be a configuration in which the plurality of secondary battery cells 100 are mounted, and may serve to transmit electrical energy, generated in the secondary battery cell 100, to an external entity or to transmit external electrical energy to the secondary battery cell 100 while protecting the secondary battery cell 100.

The flame discharge opening 210, facing the weak sealing portion 100a of the secondary battery cell 100, may be formed in the housing member. Accordingly, flame, gas, or the like, ejected from the weak sealing portion 100a, may be discharged from the internal space of the housing unit 200.

The flame discharge opening 210 of the battery module according to an example embodiment may be formed in an upper edge portion of the housing unit 200.

This is because the weak sealing portion 100a is mainly formed in the upper vertex portion of the secondary battery cell 100, and discharging a flame or gas to be adjacent to an upper vertex portion is advantageous for delaying an explosion propagation time of the secondary battery cell 100.

This can be easily understood with reference to FIGS. 9A and 9B. FIG. 9A illustrates an example embodiment in which the flame discharge opening 210 is formed adjacent to a central portion of the secondary battery cell 100, and FIG. 9B illustrates an example embodiment in which the flame discharge opening 210 is formed adjacent to an upper vertex of the secondary battery cell 100. The contents of the embodiments are summarized and listed in Table 1 below. In Table 1, an ignition time refers to a point in time at which a temperature is rapidly increased to a highest temperature, and a propagation time refers to an interval from an ignition time of a first cell to a next ignition time.

TABLE 1

| | CASE 1 (1st Cell) | CASE 2 (2nd Cell) | CASE 3 (3rd Cell) | CASE 4 (1st cell) | CASE 5 (2nd Cell) | CASE 6 (3rd Cell) |
|---|---|---|---|---|---|---|
| IT (sec) | 90 | 102 | 116 | 81 | 105 | 141 |
| ST (sec) | 0 | 12 | 26 | 0 | 24 | 60 |

IT: Ignition Time
PT: Propagation Time

As can be seen in FIG. 9B, in CASE 4 to CASE 6 in which the flame discharge opening 210 is formed adjacent to the upper vertex of the secondary battery cell 100, an ignition time is relatively delayed, as compared with CASE 1 to CASE 3 in FIG. 9A in which the flame discharge opening 210 is formed adjacent to the central portion of the secondary battery cell 100.

For example, after explosion of a first cell, flame may propagate to adjacent second and third cells to result in explosion of the second and third cells. In this case, it may be confirmed that such an ignition time is prolonged.

This may be more easily understood through a comparison between propagation times based on a time at which the first cell ignites. For example, in an example embodiment in which the flame discharge opening 210 is formed adjacent to the central portion of the secondary battery cell 100, time required for ignition of the second cell (CASE 2) is 12 seconds. On the other hand, in an example embodiment in which the flame discharge opening 210 is formed adjacent to the upper vertex of the secondary battery cell 100, time required for ignition of the second cell (CASE 5) is 24 seconds, which is 12 seconds longer than in CASE 2. In addition, in the example embodiment in which the flame discharge opening 210 is formed adjacent to the central portion of the secondary battery cell 100, time required for ignition of the third cell (CASE 3) to ignite is 26 seconds. On the other hand, in the example embodiment in which the flame discharge opening 210 is formed adjacent to the upper vertex of the cell 100, time required for ignition of the third cell (CASE 6) is 60 seconds, which is 34 seconds longer than in CASE 3.

The housing member may include a bottom member 200a, a front/rear member 200d, a sidewall member 200b, and a cover member 200c, forming an internal space in which the plurality of secondary battery cells 100 are accommodated.

The bottom member 200a may be a member on which plurality of the secondary battery cells 100 are seated. The front/rear member 200d may be provided on an edge of the bottom member 200a, and the electrode lead portions 110 of the secondary battery cells 100 may be connected to the front/rear member 200d. The sidewall member 200b may be provided on an edge of the bottom member 200a, and may be adjacent to the front/rear member 200d. The cover member 200c may be provided on upper ends of the front/rear member 200d and the sidewall members 200b.

The flame discharge opening 210 may be provided on at least one of a front/rear end portion of the cover member 200c, adjacent to the front/rear member 200d, and an upper end portion of the front/rear member 200d, adjacent to the cover member 200c.

As described above, the position of the flame discharge opening 210 is limited to the above-mentioned position. This is because forming the flame discharge opening 210 adjacent to an upper vertex than other portions of the secondary battery cell 100 and discharging flame or gas are advantageous for delaying an ignition time. The reason for this has been described above.

In addition, the bottom member 200a, the front/rear member 200d, the sidewall member 200b, and the cover member 200c, and the like, may be provided with a plate member 220 extending a flame path.

For example, the bottom member 200a, the front/rear member 200d, the sidewall member 200b, and the cover member 200c may be formed of the plate member 220 itself.

Accordingly, a rate at which the flame, generated by an explosion occurring in the secondary battery cell 100 accommodated in the internal space of the housing member, is discharged outwardly of the housing member through the bottom member 200a, the front/rear member 200d, the sidewall member 200b, the cover member 200c, and the like, may be decreased. Due to the decrease in the rate at which the flame is discharged outwardly of the housing member, an issue in which flame propagates to adjacent, another battery module to cause successive explosion may be addressed.

Specifically, the plate member 220 of the battery module according to an example embodiment may include a first plate portion 221, a second plate portion 222, and a core portion 223. The first plate portion 221 may be disposed on one side, and the second plate portion 222 may be disposed on the other side to be spaced apart from the first plate portion 221 by a predetermined interval. The core portion 223 may be disposed between the first plate portion 221 and the second plate portion 222, and may extend a flame or gas path.

As an example, when the sidewall member 200b is formed of the plate member 220, the first plate portion 221 may be disposed on one side to be exposed to the outside and the second plate portion 222 may be disposed on an internal side closer to the secondary battery cell 100 than the first plate portion 221. For example, at least a portion of both ends of the second plate portion 222 may be coupled to the first plate portion 221, and a central portion of the second plate portion 222 may be disposed to be spaced apart from the first plate portion 221 by a predetermined distance and to be closer to the secondary battery cell 100 than the first plate portion 221.

The core portion 223 may be disposed between the first plate portion 221 and the second plate portion 222. In addition, the core portion 223 may be formed to have a structure extending a path of flame entering between the first plate portion 221 and the second plate portion 222. A detailed description of the core portion 223 will be described later with reference to FIG. 7.

The flame discharge opening 210 of the battery module according to an example embodiment may be connected to a plate member 220 provided in the housing unit 200 to extend the flame path.

For example, the flame discharge opening 210 may be provided to face the weak sealing portion 100a, so that flame, gas, or the like, ejected from the weak sealing portion 100a, may rapidly spread to the inside of the plate member 220.

Accordingly, the flame, the gas, or the like, passing through the flame discharge opening 210, may decrease in temperature while passing through the plate member 220, and thus, may be discharged outwardly. In particular, the flame may be dissipated as a temperature of the flame is decreased.

The flame discharge opening 210 may include a discharge coupling pipe 211 and a discharge guide pipe 212 to effectively discharge the flame, the gas, or the like, from the inside of the housing unit 200. This will be described below in detail with reference to FIG. 4.

Figure 4:
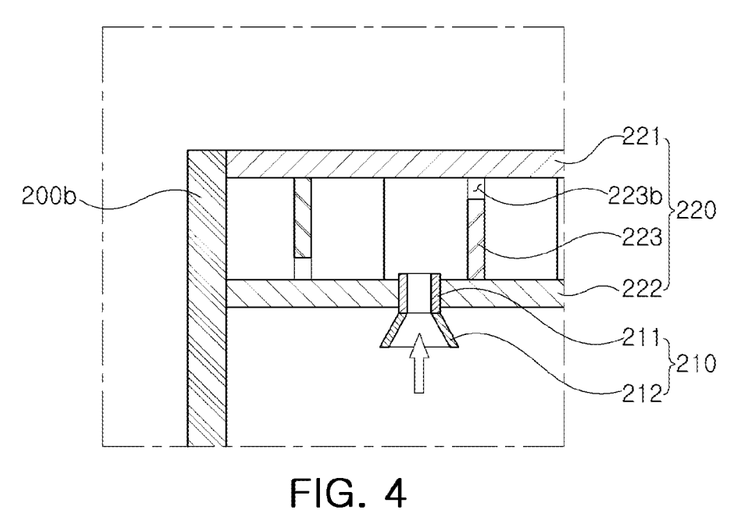
FIG. 4 is a front view illustrating an example embodiment in which a flame discharge opening includes a discharge coupling pipe and a discharge guide pipe in a battery module according to the present disclosure.

FIG. 4 is a front view illustrating an example embodiment in which the flame discharge opening 210 includes a discharge coupling pipe 211 and a discharge guide pipe 212 in the battery module according to the present disclosure. Referring to FIG. 4, the flame discharge opening 210 of the battery module according to an example embodiment may include the discharge coupling pipe 211 and the discharge guide pipe 212.

The discharge coupling pipe 211 may be coupled to the housing unit 200, and the discharge guide pipe 212 may be coupled to the discharge coupling pipe 211 and may be formed to extend toward the weak sealing portion 100a from the discharge coupling pipe 211.

For example, a gap may be formed between the housing unit 200 and the secondary battery cell 100. The discharge guide pipe 212 may be provided, so that an end portion of the flame discharge opening may be disposed to be closer to the weak sealing portion 100a than the plate member 220 of the housing unit 200.

Accordingly, a rate at which the flame and gas, ejected from the weak sealing portion 100a, escape to another position may be reduced, thereby addressing an issue in which flame, gas, or the like, generated by an explosion of one secondary battery cell 100, remain in the housing unit 200, so that other secondary battery cells 100 are relatively rapidly exposed to a high-temperature and high-pressure environment to cause rapid successive explosions.

The discharge guide pipe 212 of the battery module according to an example embodiment may be formed to have a shape in which a width thereof is increased in a direction toward the weak sealing portion 100a from the discharge coupling pipe 211.

As described above, the shape of the discharge guide is limited such that the flame and the gas, ejected from the weak sealing portion 100a, may be guided to the discharge coupling pipe 211 while increasing an area in which the flame and the gas are received. As an example, the discharge guide pipe 212 may be in the form of a cone having an open end portion, or the like.

Figure 5:
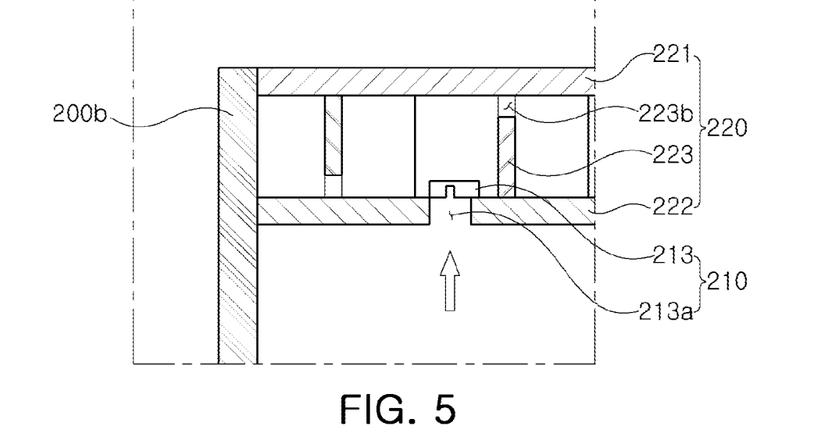
FIG. 5 is a front view illustrating an example embodiment in which a flame discharge opening includes an opening/closing plate portion provided to be broken by heat or pressure caused by an explosion of a secondary battery cell in a battery module according to the present disclosure.
Figure 6:
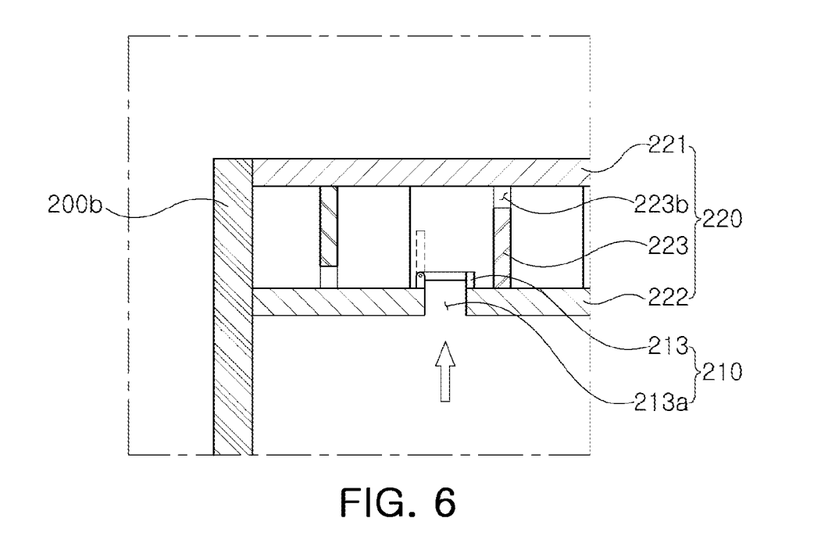
FIG. 6 is a front view illustrating an example embodiment in which a flame discharge opening includes an opening/closing plate portion provided to be rotated by pressure caused by an explosion of a secondary battery cell in a battery module according to the present disclosure.

FIG. 5 is a front view illustrating an example embodiment in which the flame discharge opening 210 includes an opening/closing plate portion 213 provided to be broken by heat or pressure caused by an explosion of the secondary battery cell 100 in the battery module according to the present disclosure, and FIG. 6 is a front view illustrating an example embodiment in which the flame discharge opening 210 includes an opening/closing plate portion 213 provided to be rotated by pressure caused by an explosion of the secondary battery cell 100 in the battery module according to the present disclosure.

Referring to FIGS. 5 and 6, the flame discharge opening 210 of the battery module according to an example embodiment may include an opening 213a formed in a portion of the housing unit 200 facing the weak sealing portion 100a, and an opening/closing plate portion opening and closing the opening 213a.

As described above, when the opening/closing plate portion 213 is opened by high-temperature and high-pressure flame, gas, or the like, discharged from the weak sealing portion 100a, the flame and gas may be discharged from the inside of the housing unit 200 through the opening 213a of the flame discharge opening 210.

External contaminants may flow backward through the plate member 220 to enter the internal space of the housing unit 200. Such an issue may be addressed by the opening/closing plate portion 213.

The opening/closing plate portion 213 may be allowed to open the flame discharge opening 210 by high-temperature and high-pressure flame, gas, or the like, discharged from the weak sealing portion 100a. To this end, the opening/closing plate portion 213 may be broken by heat or pressure of flame, gas, or the like, generated by an explosion of one secondary battery cell 100 to open the flame discharge opening 210.

In other words, the opening/closing plate portion 213 may be melted and damaged by heat, generated by the explosion of the secondary battery cell 100, to open the flame discharge opening 210, or may be damaged while cracking occurs due to high-pressure gas, generated by the explosion of the second battery cell 100, to open the flame discharge opening 210.

As an example, as illustrated in FIG. 5, a groove portion 214 may be formed in a portion of the opening/closing plate portion 213, so that the opening/closing plate portion 213 may be formed to be vulnerable to high-pressure gas, as compared with the other portions.

Alternatively, the opening/closing plate portion 213 may be provided in the form of, for example, an opening/closing door, as illustrated in FIG. 6.

For example, one end portion of the opening/closing plate portion 213 of the battery module according to an example embodiment may be hingedly-coupled to the second plate portion 222 such that the opening/closing plate portion 213 may be rotated by pressure, generated by an explosion of the one secondary battery cell 100, to open the opening 213a.

To this end, one end of the opening/closing plate portion 213 may be hingedly-coupled to the second plate portion 222 to rotate the opening/closing plate portion 213, and an elastic member providing a predetermined elastic force in a direction, in which the opening 213a is closed, may be connected to the one end portion of the opening/closing plate portion 213.

Accordingly, when the secondary battery cell 100 accommodated in the internal space explodes to form the internal space in a high-temperature and high-pressure environment, the opening/closing plate portion 213 may rotate in a direction in which the opening 213a is opened. In a normal condition, the opening/closing plate portion 213 may be disposed in a state of rotating in a direction in which the opening 213a is closed.

Figure 7:
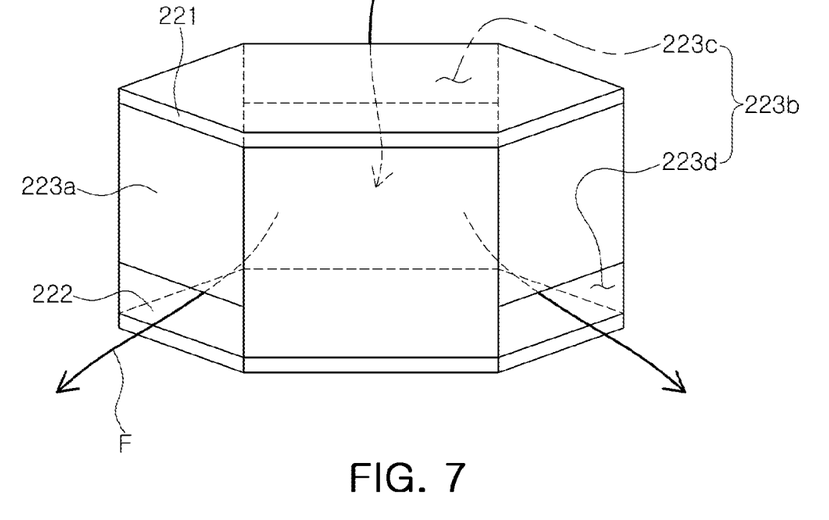
FIG. 7 is a perspective view illustrating a unit column portion of a core portion in a battery module according to the present disclosure.

FIG. 7 is a perspective view illustrating a unit column portion 223a of the core portion 223 in the battery module according to the present disclosure. Referring to FIG. 7, the core portion 223 of the battery module according to an example embodiment may be formed in a pattern in which a unit column portion 223a having a shape of a hollow polygonal column is repeated.

As described above, the core portion 223 may include a plurality of the unit column portions 223a, and flame may move while passing through the unit column portions 223a. Therefore, the core portion 223 may be configured to increase a flame path.

In addition, the core portion 223 may be disposed between the first plate portion 221 and the second plate portion 222 to serve to support the first plate portion 221 and the second plate portion 222. Accordingly, the plate member 220 may secure structural rigidity in an environment of impact, vibration, or the like, while achieving weight lightening.

The unit column portion 223a of the battery module according to an example embodiment may have opening portions 223b formed in at least two column surfaces thereof.

Accordingly, flame, gas, or the like, introduced into the unit column portion 223a of the core portion 223, may spread to adjacent, another unit column portion 223a. As a result, a flow path of the flame, gas, or the like, entering the core portion 223, may be extended.

In addition, the unit column portion 223a of the battery module according to an example embodiment may have a first opening portion 223c, formed adjacent to the first plate portion 221, and a second opening portion 223d, formed adjacent to the second plate portion 222, to form a flame path in a zigzag form.

When the opening portions 223b are formed in such a form, the flow path of the flame, gas, or the like, may further be extended, and an indirect cooling effect may also be caused. Accordingly, a flame dissipation effect may be increased and gas may be formed at a relatively low temperature.

As an example, the flame, gas, or the like, may enter the unit column portion 223a through the first opening portion 223c, and the flame, gas, or the like, may be discharged to adjacent, another unit column portion 223a through the second opening portion 223d to extend the flow path of the flame, gas, or the like.

In addition, when the first opening portion 223c is a hole formed adjacent to the first plate portion 221 and the second opening portion 223d is a hole formed adjacent to the second plate portion 222, the flame, gas, or the like, may penetrate through the unit column portion 223a on one plane, horizontal to the first plate portion 221 or the second plate portion 222 and a flow in a direction intersecting the one plane may be secured. Therefore, the flow path of the flame, gas, or the like, may further be extended in a zigzag form.

In addition, when the first plate portion 211 or the second plate portion 212 is disposed adjacent to an external side of a relatively low temperature, the flame, gas, or the like, may be cooled while passing through the first opening portion 223c or the second opening portion 223d.

Figure 8:
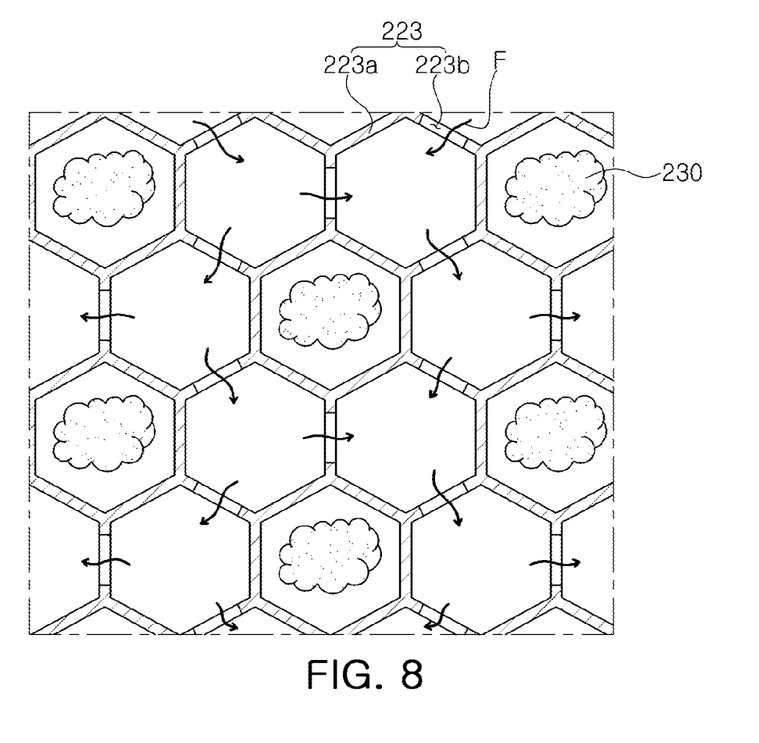
FIG. 8 is a plan view illustrating an example embodiment in which a plate member is provided with an accommodation member in a battery module according to the present disclosure.

FIG. 8 is a plan view illustrating an example embodiment in which the plate member 220 is provided with an accommodation member 230 in the battery module according to the present disclosure. Referring to FIG. 8, the plate member 220 of the battery module according to an example embodiment may include an accommodation member 230 accommodated in the space between the first plate portion 221 and the second plate portion 222 and formed of a material for performing at least one of an extinguishing function, a heat absorption function, and a fire resistance function.

Accordingly, when the first plate portion 221 or the second plate portion 222 disposed adjacent to the internal space of the housing unit 200 is melted by heat or flame, the accommodation member 230 may express at least one of the extinguishing function, the heat absorption function, and the fire resistance function while being in direct contact with the heat, flame, or the like.

As described above, a battery module according to the present disclosure may address an issue in which an explosion of one battery module causes a successive explosion of another, adjacent battery module.

For example, the battery module according to the present disclosure may prevent thermal propagation to another battery module in a thermal runaway situation of one battery module.

In another aspect, a battery module according to the present disclosure may dissipate flame generated by an explosion of one battery module.

In another aspect, a battery module according to the present disclosure may rapidly discharge at least one of flame and gas, generated by an explosion one secondary battery cell, from an inside of a housing unit.

For example, the battery module according to the present disclosure may significantly reduce an effect of at least one of the flame and the gas, generated by the explosion of one secondary battery cell, on another secondary battery cell.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
   a plurality of secondary battery cells including at least one weak sealing portion;
   a housing unit in which the plurality of secondary battery cells is accommodated,
   wherein the housing unit includes a flame discharge opening formed to face the at least one weak sealing portion such that flame or exhaust gas discharged from the weak sealing portion is guided outside of the housing unit,
   wherein the flame discharge opening is connected to a plate member provided in the housing unit to form multiple flame or exhaust gas paths inside the plate member,
   wherein the plate member comprises:
   a first plate portion disposed on one side of the plate member;
   a second plate portion spaced apart from the first plate portion to be disposed on the other side of the plate member; and
   a core portion disposed between the first plate portion and the second plate portion and the flame or exhaust gas path is disposed in the core portion,
   wherein the core portion is formed in a pattern in which a unit column portion having a shape of a hollow hexagonal column is repeated,
   wherein the unit column portion has at least three column surfaces in which opening portions are formed to form the multiple flame or exhaust gas paths, each of the at least three column surfaces forms a column surface of a different unit column portion disposed adjacent to the unit column portion, and
   wherein the opening portions are formed to penetrate parallel to the first plate portion.

2. The battery module of claim 1, wherein the flame discharge opening is formed in an upper edge portion of the housing unit.

3. The battery module of claim 1, wherein the flame discharge opening comprises:
   a discharge coupling pipe coupled to the housing unit; and
   a discharge guide pipe coupled to the discharge coupling pipe and formed to extend toward the weak sealing portion from the discharge coupling pipe.

4. The battery module of claim 3, wherein the discharge guide pipe is formed to have a shape in which a width of the discharge guide pipe is increased in a direction toward the weak sealing portion from the discharge coupling pipe.

5. The battery module of claim 1, wherein the flame discharge opening comprises:
   an opening formed in a portion of the housing unit facing the weak sealing portion; and
   an opening/closing plate portion configured to open and close the opening.

6. The battery module of claim 1, wherein the housing unit comprises:
   a bottom member on which the plurality of secondary battery cells is seated;
   a front/rear member, provided on an edge of the bottom member, to which an electrode lead portion of the secondary battery cell is connected;
   a sidewall member provided on an edge of the bottom member and adjacent to the front/rear member; and
   a cover member disposed on upper ends of the front/rear member and the sidewall member, and
   wherein the flame discharge opening is provided in at least one of the cover member adjacent to the front/rear member and the front/rear member adjacent to the cover member.

7. The battery module of claim 1, wherein the column unit portion has a first opening portion, formed adjacent to the first plate portion, and a second opening portion, formed adjacent to the second plate portion, to form the flame or exhaust gas path in a zigzag form.

8. The battery module of claim 1, wherein the plate member includes an accommodation member accommodated in a space between the first plate portion and the second plate portion and formed of a material for performing at least one of an extinguishing function, a heat absorption function, and a fire resistance function,
   wherein when the first plate portion or the second plate portion is melted by heat or flames, the accommodation member expresses at least one of the extinguishing function, the heat absorption function, and the fire resistance function while being in direct contact with the heat or flames.

9. A battery module comprising:
   a housing unit including a plate member including a first plate portion, a second plate portion, a core portion coupling the first and second plate portions together to form multiple flame or exhaust gas paths, and a flame discharge opening;
   a plurality of secondary battery cells positioned adjacent to each other inside the housing unit, wherein each of the secondary battery cells includes at least one weak sealing portion positioned adjacent to the plate member;

wherein in the event of a weak sealing portion of any of the plurality of the battery cells ruptures due to a malfunction, flame or exhaust gas escaping from the ruptured weak sealing portion is discharged via the flame discharge opening into the flame or exhaust gas path of the plate member and through the flame or exhaust gas path of the plate member to an outside of the battery module, wherein the core portion is formed in a pattern in which a unit column portion having a shape of a hollow hexagonal column is repeated, wherein the unit column portion has at least three column surfaces in which opening portions are formed to form the multiple flame or exhaust gas paths, each of the at least three column surfaces forms a column surface of a different unit column portion disposed adjacent to the unit column portion, and wherein the opening portions are formed to penetrate parallel to the first plate portion.

10. The battery module of claim 9, wherein the plate member includes a plurality of flame discharge openings, each flame discharge opening being positioned adjacent to a corresponding weak sealing portion of the plurality of the battery cells.

11. The battery module of claim 9, wherein the flame discharge opening is formed in an upper edge portion of the housing unit.

12. The battery module of claim 9, wherein the plate member comprises:
 a discharge coupling pipe fluidly coupled to the flame discharge opening; and
 a discharge guide pipe fluidly coupled to the discharge coupling pipe and extending toward the at least one weak sealing portion.

13. The battery module of claim 12, wherein a width of the discharge guide pipe is increased in a direction toward the at least one weak sealing portion.

14. The battery module of claim 9, wherein the plate member further comprises:
 an opening/closing plate portion opening and closing the at least one flame discharge opening.

15. The battery module of claim 9, wherein the housing unit comprises:
 a bottom member on which the plurality of secondary battery cells is seated;
 a front/rear member provided on an edge of the bottom member to which an electrode lead portion of the secondary battery cell is connected;
 a sidewall member provided on an edge of the bottom member and adjacent to the front/rear member; and
 a cover member disposed on upper ends of the front/rear member and the sidewall member, and
wherein the plate member is provided in at least one of the bottom member, the front/rear member, the sidewall member, and the cover member.

\* \* \* \* \*